United States Patent
Chang et al.

(10) Patent No.: US 8,798,375 B1
(45) Date of Patent: Aug. 5, 2014

(54) OBJECT RECOGNITION IN IMAGES

(71) Applicant: Google Inc., Mountain View, CA (US)

(72) Inventors: Edward Y. Chang, San Jose, CA (US);
Zhiyu Wang, Beijing (CN); Dingyin Xia, Beijing (CN)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/891,421

(22) Filed: May 10, 2013

Related U.S. Application Data

(63) Continuation of application No. 13/232,643, filed on Sep. 14, 2011, now Pat. No. 8,442,321.

(51) Int. Cl.
*G06K 9/48* (2006.01)
*G06T 7/00* (2006.01)

(52) U.S. Cl.
CPC ..................... *G06T 7/0083* (2013.01)
USPC ............................ 382/197; 382/181; 382/199

(58) Field of Classification Search
CPC .................. G06T 7/0083; G06T 2207/10016; G06T 5/001; G06T 7/0085; G06K 9/48; G06K 9/481; G06K 9/6446; G06K 9/222; G06K 9/00; G06K 9/902; G06K 9/2011; G06K 9/72
USPC .......................... 382/181, 173, 199, 219, 197; 348/E7.61; 340/426.16, 426.15; 381/73.1; 380/201; 370/200, 218; 700/17, 19, 83, 94; 709/201, 203
See application file for complete search history.

(56) References Cited

U.S. PATENT DOCUMENTS 6,400,996 B1  6/2002  Hoffberg et al. ................ 700/83

OTHER PUBLICATIONS

Hubel, et al., "Receptive fields and functional architecture of monkey striate cortex", J. Physiol. (1968), 195, pp. 215-243.
Lee, et al., "Convolutional deep belief networks for scalable unsupervised learning of hierarchical representations", ICML 2009 Workshop on Learning Feature Hierarchies, 8 pages.
Lee, et al., "Sparse deep belief net models for visual area V2", Advances in Neural Information Processing Systems, 2008, 8 pages.
Ranzato, et al., "Unsupervised Learning of Invariant Feature Hierarchies with Applications to Object Recognition", Computer Vision and Pattern Recognition, 2007. CVPR '07. IEEE Conference on Jun. 17-22, 2007, 9 pages.
Riesenhuber, et al., "Are Cortical Models Really Bound Review by the Binding Problem", Neuron, vol. 24, 87-93, Sep. 1999.
Serre, et al., "Robust Object Recognition with Cortex-Like Mechanisms", IEEE Transactions on Pattern Analysis and Machine Intelligence, vol. 29, No. 3, Mar. 2007, pp. 411-426.

*Primary Examiner* — Anh Do
(74) *Attorney, Agent, or Firm* — Fish & Richardson P.C.

(57) ABSTRACT

Methods, systems, and apparatus, including computer programs encoded on a computer storage medium, for labeling images. In one aspect, a method includes automatically identifying an object in an image using a deep model-based and data-driven hybrid architecture.

20 Claims, 6 Drawing Sheets

OBJECT RECOGNITION IN IMAGES

CROSS REFERENCE TO RELATED APPLICATION

This application is a continuation application of, and claims priority to, U.S. patent application Ser. No. 13/232,643, filed on Sep. 14, 2011, entitled "Object Recognition In Images" now U.S. Pat. No. 8,442,321. The disclosure of the foregoing application is incorporated herein by reference in its entirety.

BACKGROUND

The present disclosure relates to digital data processing and, in particular, object recognition in images.

Extracting useful features from a scene is an essential step of any computer vision and multimedia analysis tasks. In the field of neuroscience, a theory for image recognition has been established by D. Hubel and T. Wiesel in their paper titled "Receptive fields and functional architecture of monkey striate cortex" (The Journal of Physiology, 195(1):215, 1968). Many recent models for extracting features from images to recognize objects are founded on their theory that visual information is transmitted from the primary visual cortex (V1) over extra striate visual areas (V2 and V4) to the inferior temporal cortex (IT), as illustrated in FIG. 1. IT in turn is a major source of input to the prefrontal cortex (PFC), which is involved in linking perception to memory and action. The pathway from V1 to IT, which is called the visual frontend, consists of a number of simple and complex layers. The lower layers attain simple features that are invariant to scale, position and orientation at the pixel level. Higher layers detect complex features at the object-part level. Pattern reading at the lower layers are unsupervised; whereas recognition at the higher layers involves supervised learning. Computational models have been proposed by Serre (T. Serre. Learning a dictionary of shape-components in visual cortex: comparison with neurons, humans and machines. PhD thesis, Massachusetts Institute of Technology, 2006.), Lee (H. Lee, R. Grosse, R. Ranganath, and A. Ng. Convolutional deep belief networks for scalable unsupervised learning of hierarchical representations. In International Conference on Machine Learning, 2009) and Ranzato (M. Ranzato, F. Huang, Y. Boureau, and Y. LeCun. Unsupervised learning of invariant feature hierarchies with applications to object recognition. In Computer Vision and Pattern Recognition (CVPR), 2007) show such a multi-layer generative approach to be effective in object recognition. On the other hand, some heuristic-based signal-processing approaches have also been proposed to extract features from images. These two different approaches can both generate several numerical representations for an image when extracting the object features from the image.

Statistics from evaluations on these two approaches through the same image-labeling task reveals the following results: first, when the number of training instances is small, the model-based approach outperforms the heuristic-based; second, while both feature sets commit prediction errors, each does better on certain objects—neuroscience-based tends to do well on objects of a regular, rigid shape with similar interior patterns, whereas the heuristic-based model performs better in recognizing objects of an irregular shape with similar colors and textures; third, for objects that exhibit a wide variety of shapes and interior patterns, neither model performs well. The first two observations confirm that feature extraction considers both feature invariance and diversity. A feed-forward pathway model designed by Poggio's group (M. Riesenhuber and T. Poggio, *Are Cortical Models Really Bound by the Binding Problem*, Neuron, 24(1):87-93, 1999) holds promises in obtaining invariant features. However, additional signals must be collected to enhance the diversity aspect. As Serre indicates, feedback signals are transmitted back to V1 to pay attention to details. Biological evidence suggest that a feedback loop in visual system instructs cells to "see" local details such as color-based shapes and shape-based textures.

SUMMARY

This specification describes technologies relating to automatically identifying an object in an image. For this purpose, a deep model-based and data-driven hybrid architecture for labeling images is disclosed. First, a deep learning pipeline is constructed for learning image features from simple to complex progressively. This deep model-based pipeline is mixed with a data-driven pipeline, which extracts features from a large collection of unlabeled images. Sparse regularization is then performed on features extracted from both pipelines in an unsupervised way to obtain representative patches. Upon obtaining these patches, a supervised learning algorithm is employed to conduct object prediction.

In general, one innovative aspect of the subject matter described in this specification can be embodied in methods that include the actions of detecting a plurality of edges in an image under different value combinations of one or more model feature dimensions; calculating a measurement of similarity distance of each of the detected edges from one or more image patches in an image patch library, each of the image patches having values representing the model feature dimensions; creating a first image vector space, each data point in the first image vector space being based on the measurements of similarity distance of detected edges from a specific image patch in the image patch library and representing a minimal similarity distance of the image from the specific image patch; dividing the image into a plurality of first sub-images; comparing each first sub-image, using values representing one or more data feature dimensions in the first sub-image, with a plurality of second sub-images in a sub-image library to determine which second sub-images are within a threshold of similarity to the first sub-image, each of the second sub-images having values representing the data feature dimensions; creating a second image vector space, each data point in the second image vector space representing a number of first sub-images that are within the threshold of similarity to a second sub-image; combining the first and second image vector spaces and mapping the combination to an object vector space in a plurality of object vector spaces, each object vector space being labeled; and associating the image with the label of the mapped object vector space. Other embodiments of this aspect include corresponding systems, apparatus, and computer programs, configured to perform the actions of the methods, encoded on computer storage devices.

These and other embodiments can each optionally include one or more of the following features. Comparing each first sub-image with each of the second sub-images further comprises constructing a sub-image vector space for each of the first sub-images, the sub-image vector space containing values representing at least one data feature dimension. Detecting edges in the image can further comprise performing edge selection on the image to obtain a group of edges, each edge corresponding to a specific value combination of the at least one model feature dimension; and performing edge pooling on the obtained group of edges to obtain representative edges. Edge selection can be performed uses one of the following: a Gabor filter, a convolutional Restricted Boltzmann Machine (RBM), or an encoder convolution. Edge selection can be performed by convoluting the matrix of grey-scale values of the pixels in the image with a Gabor filter under a specific value combination of the at least one model feature dimension. Edge pooling can be performed by obtaining a max matrix for a sub-group of edges in the group, the edges in the group being grouped into sub-groups randomly and each value in the max matrix being the largest of the values in the corresponding positions in the edges in each sub-group. Each sub-group can have two edges. The model feature dimensions can include scale, position, and orientation. The model feature dimensions can include color and texture.

Particular embodiments of the subject matter described in this specification can be implemented so as to realize one or more of the following advantages. The system and techniques described herein can work more effectively than traditional models from both aspects of neuroscience and computational learning theory. Furthermore, the system can scale due to its sparse regularization step and its scalable supervised learning step. When an image is received, it can be compared with multiple patches. The comparison can be carried out parallel. For example, a machine learning procedure such as SVM can be used in parallel. Empirical studies show that the system works markedly better than traditional models in image labeling. The system's success is due to both its simple to complex deep pipeline for balancing invariance and selectivity, and its model-based and data-driven hybrid approach for fusing feature specificity and diversity. And its sparse regularization and parallel supervised learning steps ensure scalability to deal with data of high dimensions and large quantity.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
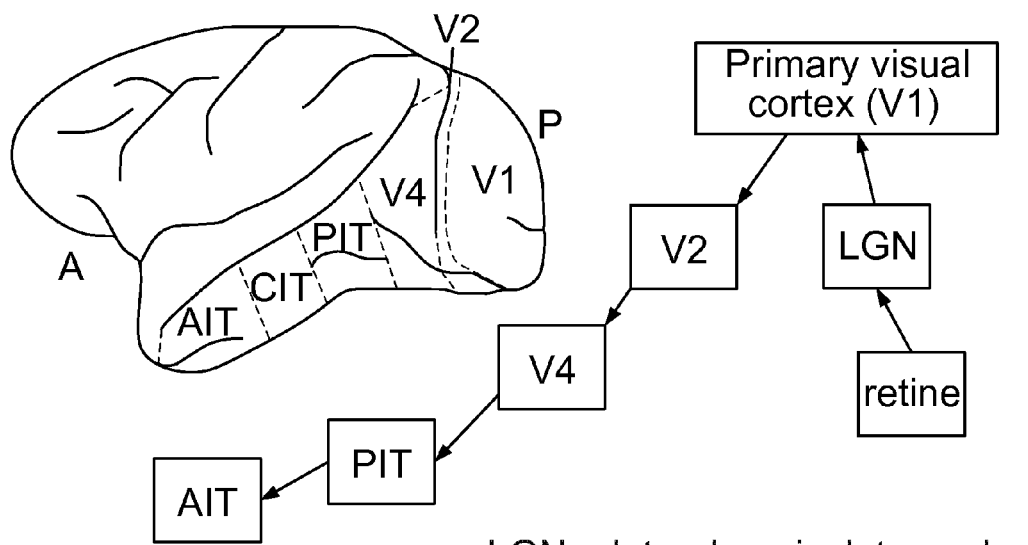
FIG. 1 illustrates the information flow in the visual cortex of a brain structure.
Figure 2:
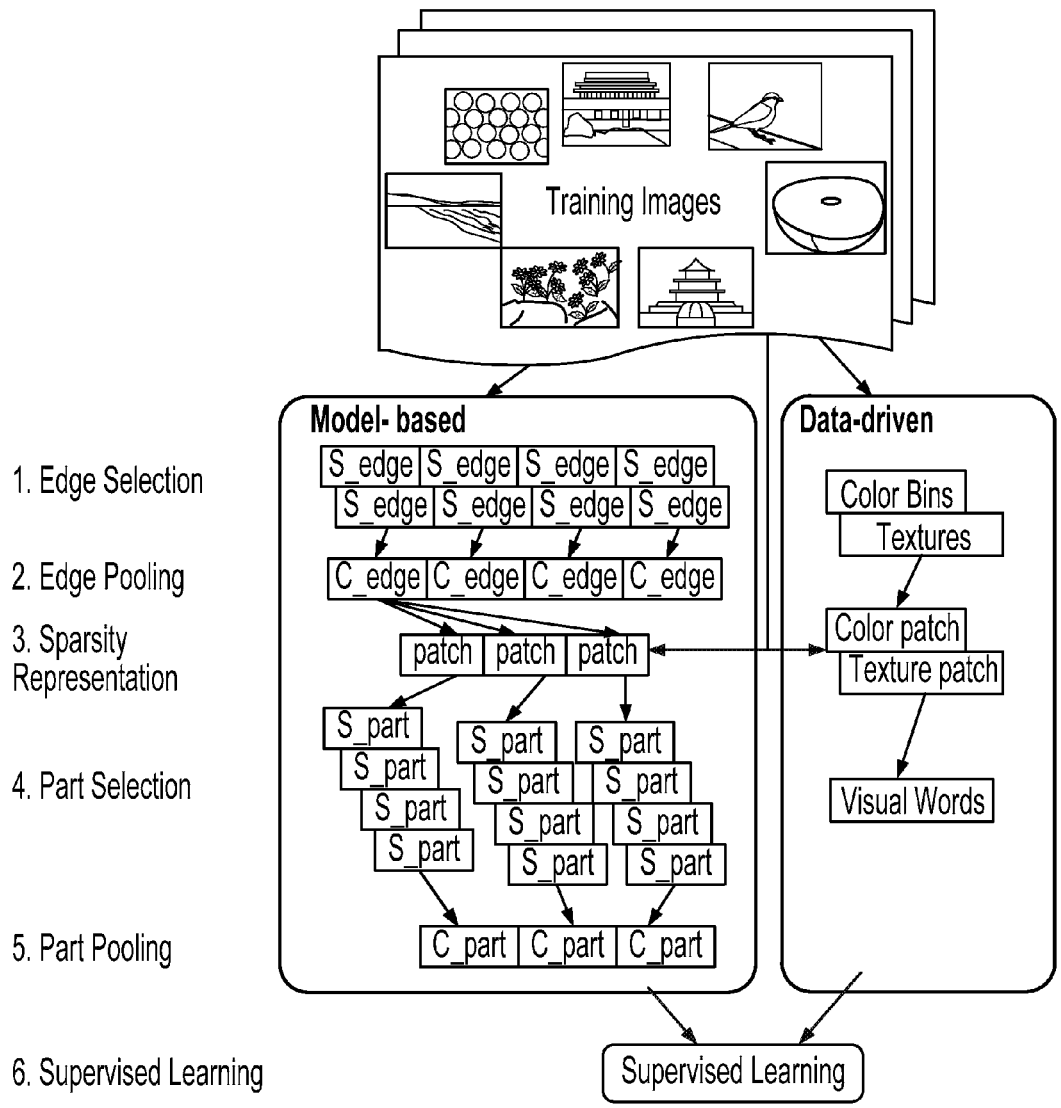
FIG. 2 is a schematic illustration of example pipelines of the image labeling process.

In various implementations, a hybrid model, referred to herein as DMD, combines a deep model-based pipeline with a data-driven pipeline to form a six-layer hierarchy. As is illustrated in FIG. 2, DMD comprises of six steps, however fewer or more steps are possible. Given a set of training images, FIG. 2 shows two paths of feature learning. The first path (on the left-hand side of the figure) feeds training images to the edge detection step. This path starts DMD's model-based pipeline. On the right-hand side of the figure, the data-driven pipeline feeds training images directly to the sparse-regularization step.

While the model-based pipeline models a deep learning architecture based on the visual cortex's feed forward path, the data-driven pipeline extracts augmented features in a heuristic-based fashion. The two pipelines join at an unsupervised middle layer, which clusters low-level features into image patches. This unsupervised layer is an important step to effectively regularize the feature space for improving subsequent supervised learning, making object prediction both effective and scalable. The unsupervised sparse regularization step reduces feature dimension and can make learning more effective. Finally, at the supervised layer, DMD employs parallel learning algorithms to map patches to semantics in a scalable way.

In various implementations, the DMD's model-based pipeline is designed with the following six steps or procedures:

Edge selection. This step corresponds to the operation conducted by cells in V1 and V2, which detect edge signals at the pixel level;

Edge pooling. This step also corresponds to cells in V1 and V2. The primary operation is to pool strong, representative edge signals;

Sparse regularization. To prevent too large a number of features, which can lead to the curse of dimensionality (i.e., some problems become intractable as the number of the variables increases), or too small a number of features, which may lead to trivial solutions, DMD uses this unsupervised step to group edges into patches;

Part selection. It is believed that V2 performs part selection and then feeds signals directly to V4. DMD models this step to look for image patches matching those prototypes (patches) produced in the previous step;

Part pooling. Cells in V4, which have larger receptive fields than V1, deal with parts. Because of their larger receptive fields, V4's selectivity is preserved over translation. Part pooling in the DMD model is described further below.

Supervised learning. In the human brain, learning occurs at all steps and certainly at the level of inferior temporal (IT) cortex and pre-frontal cortex (PFC). The supervised learning step of the DMD's model-based pipeline employs a supervised learning algorithm to map a patch-activation vector to some objects, for example.

Edge Selection

In this step, computational units model classical simple cells described by Hubel and Wiesel in the primary visual cortex (V1). A simple selective operation is performed by V1 cells. To model this operation, Serre uses Gabor filters to perform a two-dimensional (2-D) convolution, Lee suggests using a convolutional restricted Boltzmann machine (RBM), and Ranzato constructs an encoder convolution. In various implementations, Serre's strategy is selected for the DMD because of its careful tuning of parameters with physiological justifications. The input image is transmitted into a gray-value image, where only the edge information is of interest. The 2-D convolution kernel models the receptive fields of cortical simple cells. Different sizes of Gabor filters are applied as the convolution kernel to process the gray-value image I, using this format:

$$F_s(x; y) = \exp\left(-\frac{x_0^2 + \gamma^2 y_0^2}{2\sigma^2}\right) \times \cos\left(\frac{2\pi}{\lambda} x_0\right), \text{ where} \quad (1)$$

$x_0 = x\cos\theta + y\sin\theta$, and $y_0 = -x\sin\theta + y\cos\theta$.

In Equation (1), γ is the aspect ratio and θ is the orientation, which takes values 0°, 45°, 90°, and 135°. Parameters σ and λ are the effective width and wave length, respectively. The Gabor filter forms a 2-D matrix with the value at position (x,y) to be $F_s(x,y)$. The matrix size (s×s) or the Gabor filter size ranges from 7×7 to 37×37 pixels in intervals of two pixels. Thus there are 64 (16 scales×4 orientations) different receptive field types in total. With different parameters, Gabor filters can cover different orientations and scales and hence increase selectivity. The output of the edge selection step is produced by 2-D convolutions (conv2) of the input image and $n_b \times n_s \times n_f = 64$ Gabor filters of $$I_{S\_edge(i_b,i_s,i_f)} = \text{conv2}(I, F_{i_F}), \text{ where}$$

$$i_F = (i_b \times n_s + i_s) \times n_f + i_f \quad (2)$$

Edge Pooling

In the previous step, several edge-detection output matrices are produced, which sufficiently support selectivity. At the same time, there is clearly some redundant or noisy information produced from these matrices. Physiological evidence for some animals indicates that a maximization-like operation is taken in complex cells to deal with redundancy and noise. To model this maximum-like operation, Serre's, Lee's, and Ranzato's work all agree on applying a MAX operation on outputs from the simple cells. The response $I_{edge(i_b,i_f)}$ of a complex unit corresponds to the response of the strongest of all the neighboring units from the previous edge-selection layer. The output of this edge-pooling layer is as follows:

$$I_{edge(i_b,i_f)}(x,y) = \max_{i_s \in V_s, m \in N(x,y)} I_{S\_edge(i_b,i_s,i_f)}(x_m, y_m) \quad (3)$$

where $(x_m, y_m)$ stands for edge-selection results at position (x,y). The max is taken over the two scales within the same spatial neighborhood of the same orientation, as seen in the work of Serre, for example.

Sparsity Regularization

A subtle and important step of a deep architecture is to perform proper initialization between layers. The edge-pooling step may produce a huge number of edges. With such a large-sized output, the next layer may risk learning trivial solutions at the pixel level. Suggestions have been made to sparsify the output of V2 (or input to V4). See, e.g., Serre, and Ekanadham, et al., "Sparse deep belief net models for visual area V2," Advances in Neural Information Processing Systems (2008). To perform the sparsification, pixel patches can formed via sampling, for example. In this way, not only the size of the input to the part-selection step is reduced, but patches larger than pixels can regularize the learning at the upper layers. The regularization effect is achieved by the fact that parts are formed by neighboring edges, not edges at random positions. Thus, there is no reason to conduct learning directly on the edges. A patch is a region of pixels sampled at a random position of a training image at four orientations. An object can be fully expressed if enough representative patches have been sampled. It is important to note that this sampling step can be performed incrementally when new training images are available. The result of this unsupervised learning step is $n_p$ prototype patches, where $n_p$ can be set initially to be a large value, and then trimmed back by the part-selection step. It will be shown in the following texts that the data-driven pipeline also produces patches from sampling a large number of training instances. Two pipelines join at this unsupervised regularization step.

Part Selection

So far, DMD has generated patches via clustering and sampling. This part-selection step finds out which patches may be useful and of what patches an object part is composed. Part selection units describe a larger region of objects than the edge detection, by focusing on parts of the objects. Serre's S2 units behave as radial basis function (RBF) units, Lee uses a convolutional deep belief network (CDBN), and Ranzato's algorithm implements a convolutional operation for the decoder. All are consistent with well-known response properties of neurons in the primate inferior temporal cortex (IT). Serre proposes using Gaussian-like Euclidean distance to measure similarity between an image and the pre-calculated prototypes (patches). Basically, it is intended to find out what patches an object consists of Analogically, a map is constructed from object-parts to an object using the training images. Once the mapping has been learned, an unseen image can then be classified. To perform part selection, it is determined if patches obtained in the regularization step appear frequently enough in the training images. If a patch appears frequently, that patch can be selected as a part; otherwise, that patch is discarded for efficiency. For each training image, its edge patches is matched with the $n_p$ prototyped patches generated in the previous step. For the $i_b^{th}$ band of an image's edge detection output, a measure is obtained for the $i_p^{th}$ patch as follows:

$$I_{S\_part(i_b,i_p)} = \exp(-\beta \|X_{i_b} - P_{ip}\|^2) \quad (4)$$

Where β is the sharpness of the tuning and $P_{i_p}$ is one of $n_p$ the patches learned during sparsity regularization. $X_{i_b}$ is a transformation of the $I_{edge(i_b,i_f)}$ with all $n_f$ orientations merged to fit the size of $P_{i_p}$. $n_b$ measurements of the image for each prototype patch are obtained. Hence the total number of measurements that this part-selection step makes is the number of patches times the number of bands, or $n_p \times n_b$.

Part Pooling

Each image is measured against $n_p$ patches, and for each patch, $n_b$ measurements are performed. To aggregate $n_b$ measurements into one, the part-pooling units are resorted to. The part-pooling units correspond to visual cortical V4 neurons. It has been discovered that a substantial fraction of the neurons takes the maximum input as output in visual cortical V4 neurons of rhesus monkeys (macacamulatta), or $$V_{part(i_p)} = \min_{i_b} I_{S\_part(i_b,i_p)} \quad (5)$$

The MAX operation (maximizing similarity is equivalent to minimizing distance) can not only maintain feature invariance, but also scale down feature-vector size. The output of this stage for each training image is a vector of $n_p$ values.

Supervised Learning

At the top layer, DMD performs part-to-object mapping. At this layer, any traditional shallow learning algorithm can work reasonably well. In various implementations, two support vector machines PSVM (Parallel Support Vector Machine) and PLDA (Parallel Latent Dirichlet Allocation for Large-scale Applications) are employed to perform the task as they have been parallelized to run on thousands of distributed computers to deal with massive datasets.

Data-Driven Pipeline

An advantage of the model-based pipeline is feature invariance. For objects that have a rigid body of predictable patterns, such as a watch or an mobile phone, the model-based pipeline can obtain invariant features from a small number of training instances. Indeed, experiments show that it takes just a small number of training images to effectively learn the features of and to recognize e.g., a chair or a television set. Unfortunately, for objects that can have various appearances such as pizzas with different toppings, the model-based pipeline runs into limitations. The features it learned from the toppings of one pizza cannot help recognize a pizza with different toppings. The key reason for this is that invariance may cause over fitting, and that hurts selectivity. To remedy the problem, DMD adds a data-driven pipeline. The principal idea is to collect enough examples of an object so that feature selectivity can be improved. By collecting signals from a large number of training data, it is also likely to collect signals of different scales and orientations. In other words, instead of relying solely on a model-based pipeline to deal with invariance, enough examples can be collected to ensure with high probability that the collected examples can cover most transformations of features. Another duty that the data-driven pipeline can fulfill is to augment a key shortcoming of the model-based pipeline, i.e., it considers only the feed forward pathway of the visual system. It is well understood that some complex recognition tasks may require recursive predictions and verifications. Back projection models and attention models are still in early stage of development, and hence there is no solid basis of incorporating feedback. DMD uses heuristic-based signal processing subroutines to extract patches for the data-driven pipeline. The extracted patches are merged with those learned in the sparse-regularization step of the model-based pipeline. In various implementations, patches are extracted in multiple resolutions to improve invariance. Two features: color and texture, can be used to characterize images. Shapes can be considered as attributes of these main features.

An Exemplary System Structure

Figure 3:
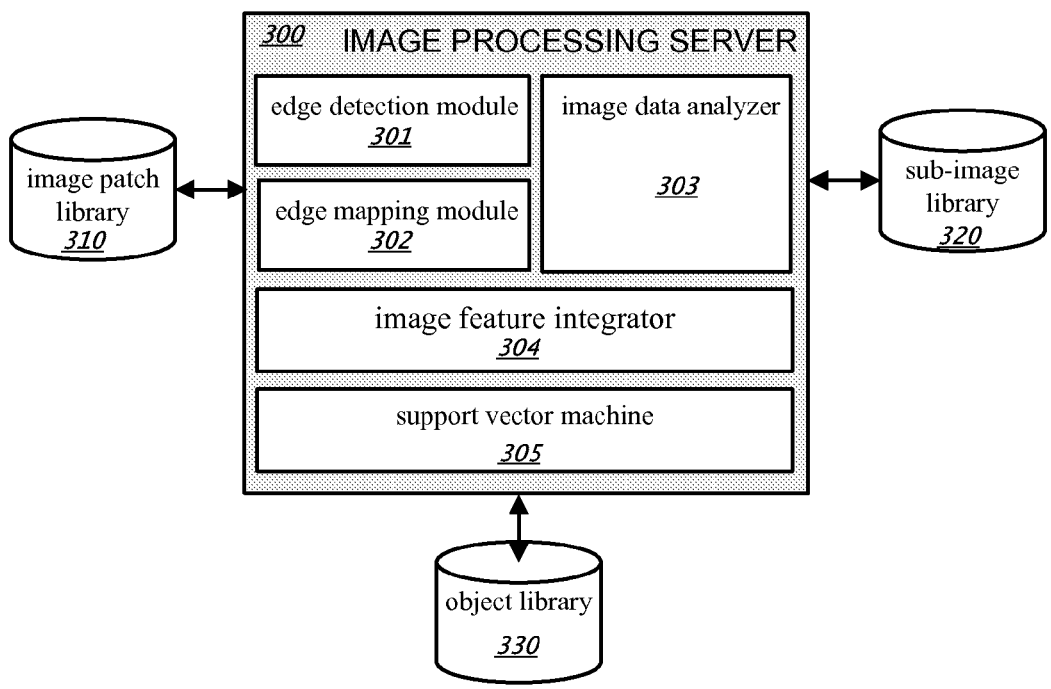
FIG. 3 illustrates an example image processing system for identifying objects in unlabeled images.

FIG. 3 is a schematic diagram of an example system configured to classify unlabeled images. In some implementations, the system comprises a server 300 (e.g., one or more data processing apparatus) and an image patch library 310, a sub-image library 320 and an object library 330. Each of the three libraries is coupled to the server 310 to store intermediate or trained data to be used in classifying an unlabeled image. Alternatively, the libraries can be in the form of a separate database, or one or more data tables in an single database, a folder containing data files under a file management system, and so on. The image patch library 310 is configured to store image patches in the form of matrices. Each of the stored image patches has values representing at least one model feature dimension (e.g., the final feature is a vector with multiple dimensions, and each patch represents at least one dimension) when the image patch was obtained from an image, such as the orientation of a Gabor filter used to extract edge features from the image, the scale of the extracted image patch, or a position in the image where the filter was applied in the image. Such values can be stored in a table of a database or one or more files under a file system, for example, and accessible by the respective modules in the server 300. The sub-image library 320 is configured to store sub-images in the form of matrices, each sub-image being of a fixed size and having values representing the at least one data feature dimension as mentioned above. The object library 330 stores labeled objects in the form of vector spaces, each such vector space representing image features extracted from an image of the labeled object.

In various implementations, the server 300 comprises software components (e.g., programs or libraries) which implement an edge detection module 301, an edge mapping module 302, an image data analyzer 303, an image feature integrator 304 and a support vector machine 305. The edge detection module 301 applies a Gabor filter on an image, and detects edges of an object in the image by using pixel level information in the image. In one implementation, the Gabor filter is applied to the image under a certain combination of some model feature dimensions, for example, using a specific position in the image as the center point of a 64×64 pixel square and applying the Gabor filter to this square at an orientation of 45°. The specific position in the image can be a pixel point in the image randomly selected or arbitrarily designated that ensures that the selected square of the designated dimension would still be an area located entirely within the image. The selected multiple edges from the same image under different combinations of the model feature dimensions would reasonably cover the major edge features of the image. The edge mapping module 302 calculates a measurement of similarity distance of the matrix representing a detected edge from the matrix of an image patch stored in the image patch library 310. For each edge obtained from an image, its similarity distance from each of the image patch in the image patch library 310 will be calculated. This calculation is carried out in a predetermined sequential order of the image patch. For example, the image patches are sequentially numbered in the image patch library 310 and each image patch will be compared with all the edges in the same sequential order. The edge mapping module 302 will finally aggregate all the similarity distances of all the edges with the same image patch to obtain one value. In some implementations, this value as a result of the aggregation can be the sum of all the similarity distances, or the average of all these similarity distances, or a value that has been scaled down to a value between zero and one. The above step is to expose the similarity between the edges obtained from the same unlabeled image with each of the image patches in the image patch library 310 that has been constructed to cover a wide diversity of image patterns.

One aggregated value is obtained for each image patch compared and these aggregated values are arranged in the sequential order of the image patches to form a vector space, which contains information about how closest the unlabeled image is to at least one image patch or a cluster of the image patches in the image patch library 310 which has been obtained from a diversified set of images. The image data analyzer 303 is configured to divide the unlabeled image into a plurality of sub-images of a fixed size, for example 64×64 pixels, calculate the data feature of each such sub-image, such as the color and texture features of this sub-image using known statistical models, and to compare each sub-image with each of the sub-images in the sub-image library 320 to determine if they are within a certain threshold of similarity. This threshold value could have been arbitrarily set or obtained through a tuning process during the training of the system. The image data analyzer 303 then counts, for each sub-image in the sub-image library 320, the number of sub-images divided from the unlabeled image that are within that threshold of similarity. A count number will then be available for each of the sub-images in the sub-image library 320. These count numbers are further arranged in a fixed order such as the sequential order of the sub-images in the sub-image library 320 to form a sub-image vector space, which reflects the similarity of the unlabeled image in terms of pixel level statistical information from the sub-images in the sub-image library 320 which cover a wide diversity of image data information.

The image feature integrator 304 is configured to combine the image vector space obtained from the model based process with the image vector space from the data-driven process, both being feature vectors for the same unlabeled image but derived through different processing pipelines, to form a new feature vector space. This new vector space is then further used as input to the support vector machine 305, in order to classify the unlabeled image with the information of the labeled images already trained in the support vector machine, to determine which labeled image or clusters of labeled images the unlabeled image is closest to. Finally, a support vector machine 305 can be a PSVM or PLDA, which is trained with a set of training images processed through both the model-based pipeline and the data-driven pipeline and can be used to classify unlabeled images similarly processed through both pipelines.

In some implementations, the image processing server 300 is optionally connected to one or more image repositories through a network and receives the unlabeled images from these repositories to process for these unlabeled images to determine what kind of objects these images may contain and thereby labeling these images with the name of these objects. The server 300 consists of one or more data processing apparatus. While only one data processing apparatus is shown in FIG. 3, multiple data processing apparatus can be used. Each such data processing apparatus may contain one or more of the various modules as exemplified in the FIG. 3, e.g. in the form of executable software programs.

Each module runs as part of the operating system on the server 300, runs as an application on the server 300, or runs as part of the operating system and part of an application on the server 300, for instance. Although several software modules are illustrated, there may be fewer or more software modules in different implementations. Moreover, the software modules can be distributed on one or more data processing apparatus connected by one or more networks or other suitable communication mediums.

The server 300 also includes hardware or firmware devices including one or more processors, one or more additional devices, a computer readable medium, a communication interface, and one or more user interface devices for possible user intervention in the image processing procedures. Each processor is capable of processing instructions for execution within the server 300. In some implementations, the processor 300 is a single or multi-threaded processor. Each processor 300 is capable of processing instructions stored on the computer readable medium 300 or on a storage device such as one of the additional devices. The server 300 uses its communication interface to communicate with one or more computers, for example, over a network. Examples of user interface devices include a display, a camera, a speaker, a microphone, a tactile feedback device, a keyboard, and a mouse. The server 300 can store instructions that implement operations associated with the modules described above, for example, on the computer readable medium or one or more additional devices, for example, one or more of a floppy disk device, a hard disk device, an optical disk device, or a tape device.

Construction of the Image Patch Library and Sub-Image Library

The image patch library 310 and sub-image library 320 can both constructed before the whole system is trained with a set of training images. In order to guarantee the specificity in the results of the processed images, diversity of the data in both image patch library 310 and the sub-image library 320 can be ensured in order to provide diversified comparisons with each processed image through this system.

In one implementation, an image repository can be used as a source of images to be processed for storage in the image patch library 310 and the sub-image library 320. A group of images can be selected from such an image repository that contains enough diversity. For example, in order to be reasonably assured that enough diversity is covered, 100,000 images of 2,000 categories can be selected from such a source. Each of these images will then be processed through the model-based approach as described above to obtain a multiple of image edges. In order to reduce the large number of image edges produced in the edge selection and edge pooling steps as a result of the large number of combinations of the different model feature dimensions applied during the edge selection step, sparsity regularization can be performed on a selected group of the obtained edges to obtain representative image patches for each image by sampling on each selected edge based on a position in the edge and one or more sizes, for example, 8×8 pixels, 16×16 pixels, 32×32 pixels and 64×64 pixels. In one implementation, the selection of the edges to perform sparsity regularization is random and the number of edges selected is 16 out of a total of 32 after edge pooling. The obtained image patches will be stored in the image patch library 310 in the form of matrices for future use in the training process and industrial process. The matrix of each image patch contains data points that already exposes the edge features in the image patch.

Similarly, each of such images can be processed through the data-driven approach to obtain a multiple of sub-images, and a subset of these sub-images can be chosen as representative sub-images by similarly employing the step of sparsity regularization and stored in the sub-image library 320 in the form of vector spaces. The vector space for each sub-image contains data points that are statistical representation of the color and/or texture features of the sub-image.

The size of both libraries can be appropriately set considering the processing workload during the later training and industrial processes. For example, the image patch library 310 can be set to contain 1,600,000 image patches, with 16 image patches extracted from each image in the 100,000 images processed. The 16 image patches obtained from each image can be in four groups, and the image patches in each group can have a size of 8×8 pixels, 16×16 pixels, 32×32 pixels and 64×64 pixels, respectively, and within each group, the four image patches can have an orientation of 0°, 45°, 90° and 135°, respectively. Each image patch can be obtained from the source image by undergoing the edge selection and edge pooling processes and extracting an image patch of the designated size centering around a single arbitrarily or randomly selected position within the image in a particular orientation from one of the edges. Also, the sub-image library 320 can contain 100,000 sub-images, with one sub-image extracted from each of the 100,00 images processed. Each sub-image in the sub-image library 320 can all be of the fixed size, for example 16×16 pixels. During the later training and industrial processes, the labeled or unlabeled image can also be divided into sub-images of this same fixed size, in this case 16×16 pixels, to be consistent in the comparisons to be performed with the sub-images already stored in the sub-image library 320. It should be noted size of both libraries can be even larger or much less, based on the different accuracy requirements and system limitations.

Figure 4:
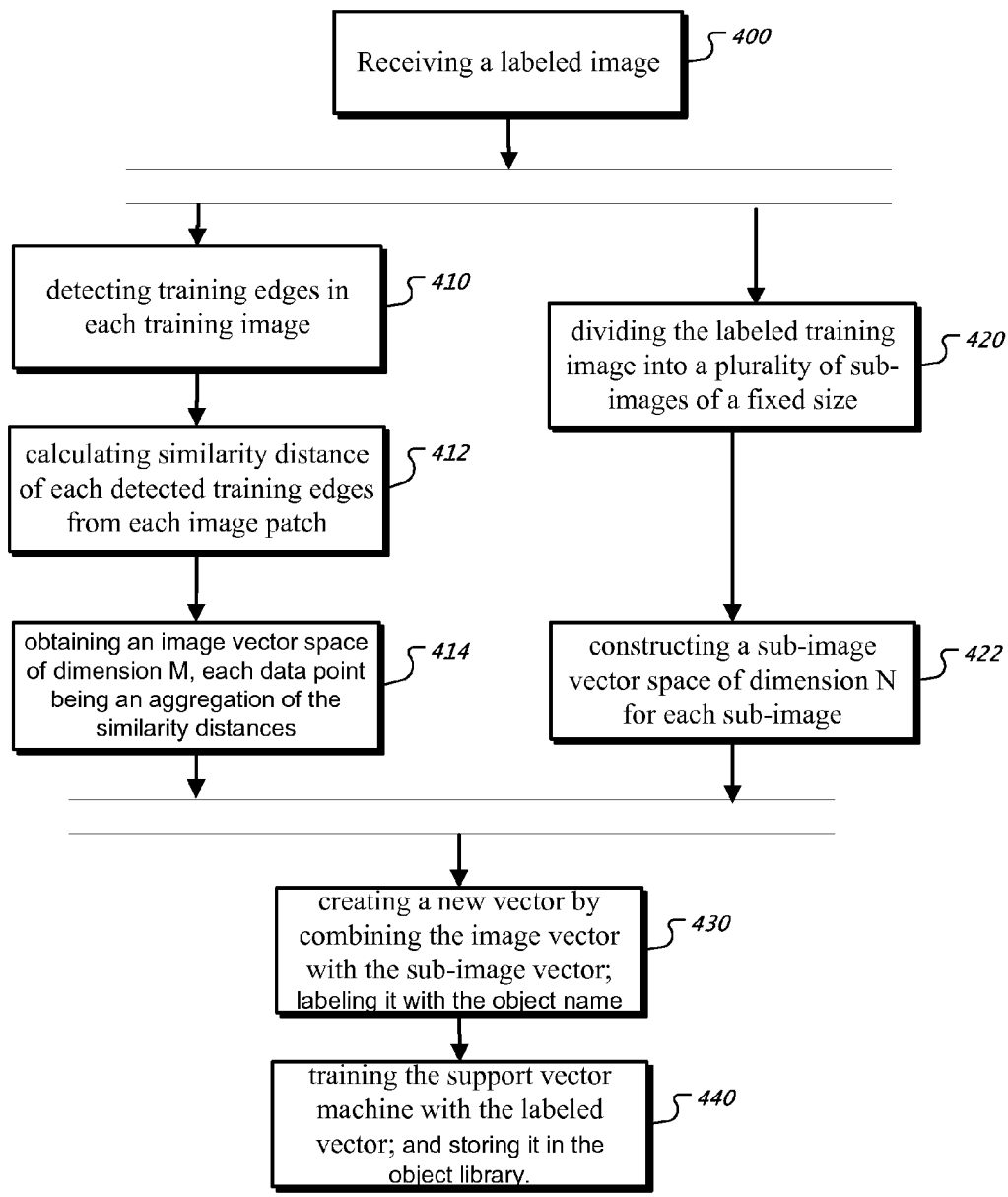
FIG. 4 is flowchart illustrating an example training technique for the image labeling system.

FIG. 4 is a flowchart illustrating an example training process for the image labeling system. At step 400, a labeled image is received for processing. The binary image data is converted is treated as a matrix, with each data point in the matrix representing, for example, the red, green and blue (RGB) values of each pixel and the position of each pixel being the position of the data point in the matrix. In one implementation, the RGB values can treated as within the range of 0-255. The matrix of this received image is then processed in a model based pipeline and a data-driven pipeline. The model based pipeline can be performed before the data-driven pipeline or after, or in parallel.

Figure 5A:
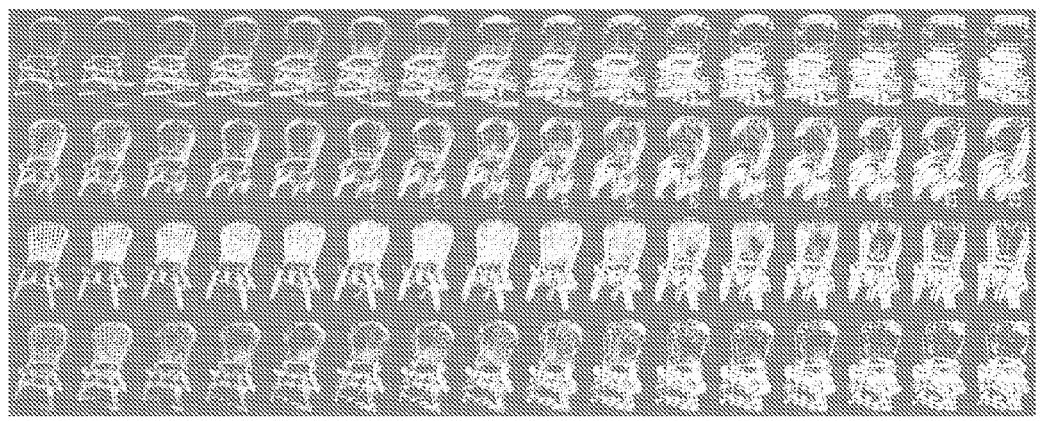
FIGS. 5A and 5B are examples of an image after processing by the edge selection and the edge pooling processes, respectively.
Figure 5B:
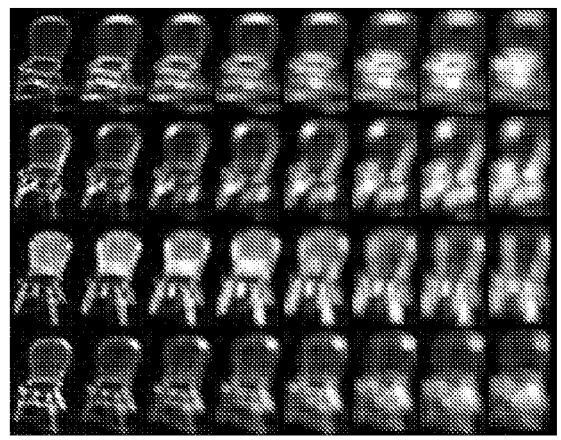

In the model based pipeline, at step 410, edge features can be detected using a Gabor filter at different model feature dimensions. These model feature dimensions can include position, scale, and orientation, etc. For example, one position can be arbitrarily or randomly selected in the image, and one of 16 scales ranging from 7×7 to 37×37 pixels in intervals of two pixels can be selected for the filter size, and one of four orientations, 0°, 45°, 90° and 135°, can be used for the filter, hence a total of 64 filters may be applied on the image. An example of the applied filter is illustrated in the equation (1) as noted above. The results from applying the Gabor filter can be further converted using a 2-D convolutions (conv2) as noted in the above equation (2) to expose the edge features in the obtained 64 image edges. An example of the 64 edges obtained from an image containing an object of a chair is illustrated in FIG. 5A. These 64 edges of an object chair are cast back into images from the matrix values of the edges obtained from the edge selection process on the original image. As the number of edges at this step are still large, a pooling step can be further performed on these edges to reduce the number of edges, and at the same time reducing the noise or redundancy in the obtained edges. In one implementation, a maximization-like operation can be performed on the 64 edges, for example, using the equation (3) as demonstrated previously, to obtain a max value matrix of two edges, which are of two scales within the same spatial neighborhood of the same orientation. The result of this edge pooling step is 32 edges which are more representative of the edge features in the original image, as schematically shown in FIG. 5B. Alternative measures can be taken at the edge pooling step to produce more or less representative edges for further processing, with the balance of limitation of processing power and accuracy requirement of the entire system being in consideration.

Next, at step 412, the 32 representative edges, each being a matrix exposing the edge features of the original image, are compared with each image patch in the image patch library to calculate their similarity distance. The number of image patches being compared for a particular edge during the training process of an image can be fixed at the same number, (e.g., 1,600,000). Alternatively, the image patches in the image patch library 310 can be those of the same scale as that of the image edge. As noted above, the number of image patches in an exemplary image patch library 310 contains 16 image patches for each processed image during the construction of the image patch library 310. Each scale has four image patches respectively, the number of image patches being compared for a particular edge during the training process of an image will always be fixed at the same number, in this example 400,000, though the actual image patches being compared are different for an image edge of a different scale. Each comparison can be conducted using a Gausian-like Euclidean distance to measure the similarity distance between an image edge and an image patch of the same scale in the image patch library 310, for example. The measure of this distance can be exemplified by the equation (4) as noted previously.

After the similarity distance of each of the 32 edges of the original labeled image from each of the 1,600,000 image patches (or 400,000 images in the other example noted above) has been calculated, a further step of part pooling is performed at step 414 to obtain a vector space containing 1,600,000 data points and representing an aggregated model feature projected on the diversified image patch library 310. This step is fulfilled by aggregating all the similarity distances thus calculated using equation (4) for each image patch compared. The aggregation can be in the form of a summation of all the 32 similarity distance values as a result of the 32 edges being compared with the same image patch, or an average value of these similarity distance values, or a value scaled down to a range between 0-1 from the summation of all the 32 values, etc. For each image patch, one aggregated value will be obtained. All the 1,600,000 aggregated values will then be arranged according to a fixed order, for example the sequential order of all the image patches, to form a vector space of dimension 1,600,000, representing the pattern features of the labeled image as exposed by projection onto the diversified image patch library 310.

In the other pipeline of data-driven approach, at step 420, the labeled image is first divided into a plurality of sub-images of a fixed size, for example, 16×16 pixels. Statistical data about the pixel level information will then be gleaned from each of such sub-images. The way such statistical data are gleaned should follow the same method as did with the sub-images already stored in the sub-image library 320. Such statistical data can include the summation values of some representative color information with the sub-image or a scaled down value of the same, etc, and those for texture information in the sub-image. Specific models for extracting statistical data information in terms of at least color and texture in an image are known in the art and can be used to obtain the statistical data feature of the sub-image in the form of a vector space. At least some of the data points in the this vector represent color information and some represent texture information of the sub-image processed. For example, the first three data points in the vector space represent the summation of all the pixels values in the sub-image for red, yellow, or blue colors, etc. The particular order of these data points in the vector space should be identical to those for the sub-images already stored in the sub-image library 320, thereby similarity comparisons are possible between a sub-image and each of the sub-images in the sub-image library 320.

At step 422, each sub-image derived from the labeled image is compared with each of the sub-image stored in the sub-image library 320 to determine if both are with a threshold of similarity distance. The particular value of this threshold can be an arbitrary value or tuned during the training process in feedback loops for better performance of the system. For each of the 100,000 sub-images from the sub-image library 320, the number of sub-images from the labeled image that are with the threshold of similarity measurement are counted and recorded. The recorded count values are arranged in a fix order, for example according to the sequential order of the sub-images in the sub-image library 310, to form a vector space of dimension 100,000, which captures the features of the labeled image in terms pixel level statistical data at least about colors and textures by projecting them onto a diversified library of sub-images for comparison.

At step 430, a new vector space is created by simply combining the vector space obtained at step 414 with that at step 422. This combined vector space captures the features of the labeled image through both a model based approach and data-driven approach. Also, the name of the object in the label image, as already labeled with the image, is attached to this combined vector space as an identifying label for this vector space. After that, the new labeled vector space is sent to a support vector machine 305, such as a PSVM or PLDA, to train it for future recognition of similar patterns of vector spaces during the industrial process. The labeled vector space is stored in an object library 330 when the above steps are completed.

In the above way, each labeled image, carefully selected to represent enough diversity and specificity, is used to train the system. By the end of this training process, the support vector machine 305 can remember enough patterns to potentially classify an unlabeled image using the existing labeled data already it processed. The object library 330, coupled to the support vector machine and storing labeled objects in the form of vector spaces, will also have a full list of trained images in the form of featured vector spaces which are labeled with the name of the respective objects in the images.

Figure 6:
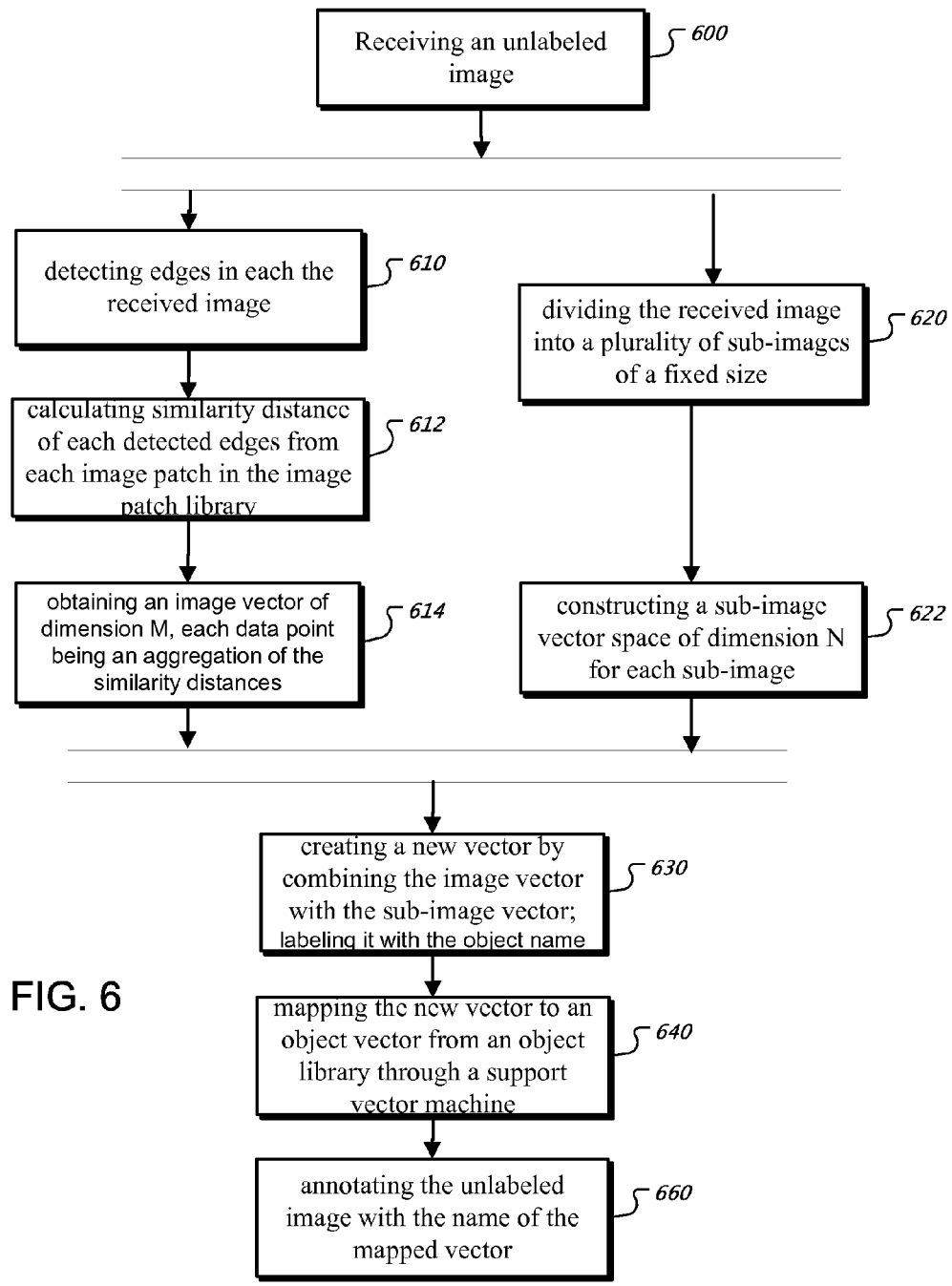
FIG. 6 is flowchart illustrating an example process of the image labeling system.

FIG. 6 is a flowchart illustrating an example process of the image labeling system. This process of processing unlabeled images can be identical in both pipelines of the model based approach and the data-driven approach. At step 600, an image to be labeled is received. At step 610, 64 edges will first be selected through 64 different Gabor filters using different combinations of the model feature dimensions of scale, orientation and position, and then aggregated into 32 edges through a maximization-like operation. At step 612, the detected 32 edges will then be used to calculate their similarity distance from each image patch in the image patch library 310. The measurements of these similarity distances will be further aggregated at step 614 to obtain an image vector space of dimension 1,600,000.

At step 620, the received unlabeled image is divided into a plurality of sub-images of size 16×16, statistical data features in color and texture are collected from these sub-images, and for each sub-image a vector space recording such data feature information is created. Each sub-image derived from the unlabeled image and represented by the vector space is compared with each sub-image in the sub-image library 320, and the number of sub-images derived from the unlabeled image that are within the predetermined threshold of similarity with each sub-image in the sub-image library 320 is counted and recorded. These counted numbers for each sub-image in the sub-image library are used to construct a sub-image vector space of a dimension of 100,000, for example, at step 622, representing features of the labeled image in terms of pixel level statistical data about colors and textures projected onto a diversified library of sub-images for comparison.

Some sub-images containing color and texture information are created. A set of them are selected (e.g., 100,000 sub-images) such as from a clustering center, for example, to construct a sub-image vector space. New images are divided into sub-images and corresponding sub-images (if any) from the sub-image vector space are identified. For example, assume an image A is divided into sub-images A1, A2, A3, . . . An, and the corresponding sub-images in the vector space are B1, B2, B1, B1, B2, B3, . . . , Bm. In some implementations, the number of Bk is counted. Therefore, B1 appears 3 times, B2 appears 2 times, B3 appears 1 time, B4 none. This yields a feature vector of (3, 2, 1, 0, . . . ). Since there can be many zeros in the vector, the sub-image vector space is a sparse library for sub-image comparison.

At step 630, a new vector space is created by combining the vector space created at step 614 with that created at step 622. The combined new vector space is then used as input to the support vector machine 305. This new vector space will be mapped at step 640 by the support vector machine 305 to a cluster of at least one labeled vector space previously stored in the object library 330 through the training process. The name of the object of the representative vector space in the cluster will then be used to identify the object in the unlabeled image thus far processed, hence this unlabeled image can be automatically labeled with the name of this object at step 660.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementations or of what may be claimed, but rather as descriptions of features specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by data processing apparatus, the method comprising:
   dividing, by the data processing apparatus, an image into a plurality of first sub-images;
   comparing, by the data processing apparatus, each first sub-image, using values representing one or more data feature dimensions in the first sub-image, with a plurality of second sub-images in a sub-image library to determine which second sub-images are within a threshold of similarity to the first sub-image, each of the second sub-images having values representing a plurality of model feature dimensions;
   creating, by the data processing apparatus, a first image vector space, each data point in the first image vector space representing a number of first sub-images that are within the threshold of similarity to a second sub-image;
   combining, by the data processing apparatus, the first image vector space and a second image vector space and mapping the combination to an object vector space in a plurality of object vector spaces, each object vector space being labeled; and associating the image with the label of the mapped object vector space.

2. The method of claim 1, further comprising:
detecting a plurality of edges in the image under different value combinations of one or more of the model feature dimensions;
calculating a measurement of similarity distance of each of the detected edges from one or more image patches in an image patch library, each of the image patches having values representing the model feature dimensions; and
creating the second image vector space, each data point in the second image vector space being based on the measurements of similarity distance of detected edges from a specific image patch in the image patch library and representing a minimal similarity distance of the image from the specific image patch.

3. The method of claim 2, wherein detecting edges in the image further comprises:
performing edge selection on the image to obtain a group of edges, each edge corresponding to a specific value combination of the at least one of the model feature dimension; and
performing edge pooling on the obtained group of edges to obtain representative edges.

4. The method of claim 3, wherein edge selection is performed uses one of the following: a Gabor filter, a convolutional Restricted Boltzmann Machine (RBM), or an encoder convolution.

5. The method of claim 3, wherein edge selection is performed by convoluting the matrix of grey-scale values of the pixels in the image with a Gabor filter under a specific value combination of the at least one model feature dimension.

6. The method of claim 3, wherein edge pooling is performed by obtaining a max matrix for a sub-group of edges in the group, the edges in the group being grouped into sub-groups randomly and each value in the max matrix being the largest of the values in the corresponding positions in the edges in each sub-group.

7. The method of claim 6, wherein each sub-group has two edges.

8. The method of claim 1, wherein the model feature dimensions include scale, position, and orientation.

9. The method of claim 1, wherein the model feature dimensions include color and texture.

10. The method of claim 1, wherein comparing each first sub-image with each of the second sub-images further comprises constructing a sub-image vector space for each of the first sub-images, the sub-image vector space containing values representing at least one model of the feature dimensions.

11. A system, comprising:
a data processing apparatus; and
a non-transitory computer storage medium in data communication with the data processing apparatus and storing instructions that when executed by the data processing apparatus cause the data processing apparatus to perform operations comprising:
dividing an image into a plurality of first sub-images;
comparing each first sub-image, using values representing one or more data feature dimensions in the first sub-image, with a plurality of second sub-images in a sub-image library to determine which second sub-images are within a threshold of similarity to the first sub-image, each of the second sub-images having values representing a plurality of model feature dimensions;
creating a first image vector space, each data point in the first image vector space representing a number of first sub-images that are within the threshold of similarity to a second sub-image;
combining the first image vector space and a second image vector space and mapping the combination to an object vector space in a plurality of object vector spaces, each object vector space being labeled; and
associating the image with the label of the mapped object vector space.

12. The system of claim 11, the operations further comprising:
detecting a plurality of edges in the image under different value combinations of one or more of the model feature dimensions;
calculating a measurement of similarity distance of each of the detected edges from one or more image patches in an image patch library, each of the image patches having values representing the model feature dimensions; and
creating the second image vector space, each data point in the second image vector space being based on the measurements of similarity distance of detected edges from a specific image patch in the image patch library and representing a minimal similarity distance of the image from the specific image patch.

13. The system of claim 12, wherein detecting edges in the image further comprises:
performing edge selection on the image to obtain a group of edges, each edge corresponding to a specific value combination of the at least one of the model feature dimension; and
performing edge pooling on the obtained group of edges to obtain representative edges.

14. The system of claim 13, wherein edge selection is performed uses one of the following: a Gabor filter, a convolutional Restricted Boltzmann Machine (RBM), or an encoder convolution.

15. The system of claim 13, wherein edge selection is performed by convoluting the matrix of grey-scale values of the pixels in the image with a Gabor filter under a specific value combination of the at least one model feature dimension.

16. The system of claim 13, wherein edge pooling is performed by obtaining a max matrix for a sub-group of edges in the group, the edges in the group being grouped into sub-groups randomly and each value in the max matrix being the largest of the values in the corresponding positions in the edges in each sub-group.

17. The system of claim 16, wherein each sub-group has two edges.

18. The system of claim 11, wherein the model feature dimensions include scale, position, and orientation.

19. The system of claim 11, wherein the model feature dimensions include color and texture.

20. A non-transitory computer storage medium in data communication with the data processing apparatus and storing instructions that when executed by the data processing apparatus cause the data processing apparatus to perform operations comprising:
dividing an image into a plurality of first sub-images;
comparing each first sub-image, using values representing one or more data feature dimensions in the first sub-image, with a plurality of second sub-images in a sub-image library to determine which second sub-images are within a threshold of similarity to the first sub-image, each of the second sub-images having values representing a plurality of model feature dimensions;

creating a first image vector space, each data point in the first image vector space representing a number of first sub-images that are within the threshold of similarity to a second sub-image;

combining the first image vector space and a second image vector space and mapping the combination to an object vector space in a plurality of object vector spaces, each object vector space being labeled; and associating the image with the label of the mapped object vector space.

* * * * *